(12) United States Patent
Machizaud et al.

(10) Patent No.: US 10,336,124 B2
(45) Date of Patent: *Jul. 2, 2019

(54) SECURITY ELEMENT COMPRISING AN INTERFERENCE PIGMENT AND A NANOMETRIC FILLER

(71) Applicant: OBERTHUR FIDUCIAIRE SAS, Paris (FR)

(72) Inventors: Jacques Machizaud, Voiron (FR); Aurelie Maman, Chasselay (FR); Michel Camus, Rives (FR)

(73) Assignee: OBERTHUR FIDUCIAIRE SAS, Paris (FR)

( * ) Notice: Subject to any disclaimer, the term of this patent is extended or adjusted under 35 U.S.C. 154(b) by 171 days.

This patent is subject to a terminal disclaimer.

(21) Appl. No.: 14/783,703

(22) PCT Filed: Apr. 9, 2014

(86) PCT No.: PCT/IB2014/060560
§ 371 (c)(1),
(2) Date: Oct. 9, 2015

(87) PCT Pub. No.: WO2014/167512
PCT Pub. Date: Oct. 16, 2014

(65) Prior Publication Data
US 2016/0075165 A1 Mar. 17, 2016

(30) Foreign Application Priority Data
Apr. 11, 2013 (FR) .................................... 13 53251

(51) Int. Cl.
*B42D 25/355* (2014.01)
*B32B 3/26* (2006.01)
(Continued)

(52) U.S. Cl.
CPC ............ *B42D 25/355* (2014.10); *B32B 3/266* (2013.01); *B42D 25/369* (2014.10);
(Continued)

(58) Field of Classification Search
None
See application file for complete search history.

(56) References Cited

U.S. PATENT DOCUMENTS 3,858,977 A * 1/1975 Baird .................... G02B 5/285
356/71
4,017,326 A * 4/1977 Davis ..................... B05D 5/06
106/415
(Continued)

FOREIGN PATENT DOCUMENTS

AU 2011276149 A1 2/2013
CN 1264340 A 8/2000
(Continued)

OTHER PUBLICATIONS

Machine Translation of JP 09169161 A, Jun. 1997.*
(Continued)

*Primary Examiner* — Jeffrey A Vonch
(74) *Attorney, Agent, or Firm* — Jones Robb, PLLC

(57) ABSTRACT

A security element, preferably a security wire, for a secure document, that may include a masking structure for reducing the visibility of a surface of the element when the latter is located inside the document or on the surface of the document, the masking structure comprising a nanometric filler and a multilayer interference pigment.

24 Claims, 1 Drawing Sheet

(51) Int. Cl.
*C08K 3/013* (2018.01)
*D21H 17/67* (2006.01)
*D21H 17/69* (2006.01)
*D21H 21/44* (2006.01)
*D21H 21/48* (2006.01)
*B42D 25/369* (2014.01)
*B42D 25/378* (2014.01)
*C08K 3/36* (2006.01)
*C08K 9/00* (2006.01)
*B32B 19/02* (2006.01)
*B32B 19/04* (2006.01)
*D21H 21/52* (2006.01)
*B42D 25/351* (2014.01)
*B82Y 30/00* (2011.01)

(52) U.S. Cl.
CPC ............ *B42D 25/378* (2014.10); *C08K 3/013* (2018.01); *C08K 3/36* (2013.01); *C08K 9/00* (2013.01); *D21H 17/67* (2013.01); *D21H 17/69* (2013.01); *D21H 21/44* (2013.01); *D21H 21/48* (2013.01); *B32B 19/02* (2013.01); *B32B 19/04* (2013.01); *B32B 2250/02* (2013.01); *B32B 2250/03* (2013.01); *B32B 2250/04* (2013.01); *B32B 2260/025* (2013.01); *B32B 2264/10* (2013.01); *B32B 2264/102* (2013.01); *B32B 2264/12* (2013.01); *B32B 2554/00* (2013.01); *B42D 25/351* (2014.10); *B82Y 30/00* (2013.01); *D21H 21/52* (2013.01); *Y10T 428/24298* (2015.01); *Y10T 428/24322* (2015.01); *Y10T 428/24331* (2015.01); *Y10T 428/251* (2015.01); *Y10T 428/256* (2015.01); *Y10T 428/259* (2015.01); *Y10T 428/2817* (2015.01); *Y10T 428/2911* (2015.01); *Y10T 428/2982* (2015.01); *Y10T 428/2991* (2015.01); *Y10T 428/2993* (2015.01)

(56) References Cited

U.S. PATENT DOCUMENTS

| | | | |
|---|---|---|---|
| 4,307,899 A * | 12/1981 | Hoppe | B41M 3/14 283/110 |
| 4,442,170 A * | 4/1984 | Kaule | B41M 3/144 101/DIG. 46 |
| 4,451,521 A * | 5/1984 | Kaule | B41M 3/144 101/DIG. 46 |
| 4,452,843 A * | 6/1984 | Kaule | B41M 3/144 101/DIG. 46 |
| 4,462,867 A * | 7/1984 | Fuller | D21F 11/006 162/103 |
| 4,892,336 A | 1/1990 | Kaule et al. | |
| 4,941,687 A * | 7/1990 | Crane | D21H 21/44 216/33 |
| 5,068,008 A * | 11/1991 | Crane | D21H 21/44 216/102 |
| 5,087,507 A * | 2/1992 | Heinzer | B41M 3/144 156/277 |
| 5,275,870 A * | 1/1994 | Halope | B41M 3/10 428/199 |
| 5,354,099 A | 10/1994 | Kaule et al. | |
| 5,424,119 A * | 6/1995 | Phillips | B29C 41/24 428/328 |
| 5,516,153 A | 5/1996 | Kaule | |
| 5,573,584 A * | 11/1996 | Ostertag | B41M 3/14 101/491 |
| 5,573,639 A * | 11/1996 | Schmitz | D21H 21/44 162/104 |
| 5,697,649 A * | 12/1997 | Dames | D21H 21/48 162/140 |
| 5,871,833 A | 2/1999 | Henbo et al. | |
| 5,876,068 A * | 3/1999 | Schneider | D21H 21/44 283/86 |
| 5,922,465 A * | 7/1999 | Gailberger | B05D 5/065 264/129 |
| 5,944,927 A * | 8/1999 | Seifert | D21H 21/42 156/153 |
| 5,985,424 A | 11/1999 | Dematte et al. | |
| 6,036,232 A * | 3/2000 | Kaule | B42D 25/29 283/85 |
| 6,165,592 A * | 12/2000 | Berger | B42D 25/29 250/486.1 |
| 6,210,777 B1 * | 4/2001 | Vermeulen | B41M 3/14 283/72 |
| 6,318,758 B1 | 11/2001 | Stenzel et al. | |
| 6,472,455 B1 * | 10/2002 | Bleikolm | C09C 1/0015 523/160 |
| 6,474,695 B1 * | 11/2002 | Schneider | D21H 21/44 235/379 |
| 6,490,090 B1 * | 12/2002 | Kumazawa | B32B 7/02 359/580 |
| 6,491,324 B1 * | 12/2002 | Schmitz | B42D 25/355 235/487 |
| 6,517,628 B1 * | 2/2003 | Pfaff | A61K 8/11 106/410 |
| 6,565,770 B1 * | 5/2003 | Mayer | B82Y 10/00 106/403 |
| 6,596,070 B1 * | 7/2003 | Schmidt | A61Q 1/02 106/415 |
| 6,747,073 B1 * | 6/2004 | Pfaff | B41M 3/14 106/403 |
| 6,767,633 B2 * | 7/2004 | Steudel | C08K 3/013 428/357 |
| 6,815,065 B2 * | 11/2004 | Argoitia | C09C 1/0015 359/566 |
| 2002/0022093 A1 * | 2/2002 | Kuntz | C09B 67/0098 428/29 |
| 2002/0025418 A1 * | 2/2002 | Ishibashi | B41M 3/14 428/211.1 |
| 2002/0056758 A1 | 5/2002 | Stenzel et al. | |
| 2002/0141957 A1 * | 10/2002 | Tan | A61K 8/26 424/63 |
| 2003/0008120 A1 * | 1/2003 | Andes | A61K 8/19 428/212 |
| 2003/0012935 A1 * | 1/2003 | Kuntz | B42D 25/00 428/209 |
| 2003/0104206 A1 * | 6/2003 | Argoitia | B41M 3/14 428/404 |
| 2003/0194578 A1 * | 10/2003 | Tam | D01D 5/24 428/690 |
| 2004/0023008 A1 | 2/2004 | Rosset | |
| 2004/0144023 A1 * | 7/2004 | Bruckner | A61K 8/25 47/29.4 |
| 2004/0151827 A1 * | 8/2004 | Argoitia | C09C 1/0015 427/7 |
| 2004/0151880 A1 * | 8/2004 | Nakamura | B41M 3/14 428/195.1 |
| 2004/0191198 A1 * | 9/2004 | Hochstein | A61K 8/26 424/63 |
| 2005/0052519 A1 * | 3/2005 | Mayer | B41M 3/14 347/105 |
| 2005/0063067 A1 * | 3/2005 | Phillips | G03H 1/0236 359/614 |
| 2005/0151368 A1 * | 7/2005 | Heim | B42D 25/29 283/72 |
| 2005/0158526 A1 * | 7/2005 | Ino | C09D 5/22 428/207 |
| 2005/0253374 A1 * | 11/2005 | Payne | G09F 3/0291 283/81 |
| 2006/0032404 A1 * | 2/2006 | Kniess | A61K 8/19 106/481 |
| 2006/0097511 A1 * | 5/2006 | Keller | B42D 25/355 283/72 |
| 2006/0163371 A1 * | 7/2006 | Veil | B41M 3/14 235/494 |
| 2006/0231225 A1 | 10/2006 | Lejeune | |

(56) References Cited

U.S. PATENT DOCUMENTS

| | | | |
|---|---|---|---|
| 2007/0006127 A1* | 1/2007 | Kuntz | B41M 3/144 717/104 |
| 2007/0028799 A1* | 2/2007 | Kniess | C09C 1/0015 106/31.6 |
| 2007/0039521 A1* | 2/2007 | Zimmermann | C09C 1/0024 106/415 |
| 2007/0095929 A1* | 5/2007 | Cote | G06K 19/06046 235/494 |
| 2007/0206249 A1* | 9/2007 | Phillips | C09J 11/02 359/2 |
| 2007/0246933 A1* | 10/2007 | Heim | B42D 25/29 283/98 |
| 2007/0264476 A1* | 11/2007 | Bala | B41M 3/144 428/195.1 |
| 2007/0281177 A1* | 12/2007 | Haubrich | B41M 3/148 428/457 |
| 2008/0024847 A1* | 1/2008 | Kittler, Jr. | G03H 1/0011 359/2 |
| 2008/0030020 A1* | 2/2008 | Mallol | D21H 21/44 283/91 |
| 2008/0129036 A1* | 6/2008 | Seki | D21H 21/42 283/67 |
| 2008/0207772 A1* | 8/2008 | Kniess | A61K 8/19 514/769 |
| 2009/0230670 A1* | 9/2009 | Schmid | B42D 25/29 283/85 |
| 2009/0258200 A1* | 10/2009 | Scholz | B42D 25/29 428/199 |
| 2010/0015337 A1* | 1/2010 | Becker | B41M 3/14 427/258 |
| 2010/0060987 A1* | 3/2010 | Witzman | G02B 5/286 359/589 |
| 2010/0112314 A1* | 5/2010 | Jiang | C09D 11/50 428/199 |
| 2010/0194093 A1 | 8/2010 | MacPherson | |
| 2010/0213698 A1 | 8/2010 | Snelling et al. | |
| 2010/0230615 A1* | 9/2010 | MacPherson | B44F 1/10 250/488.1 |
| 2010/0266647 A1* | 10/2010 | Dingley | A61K 8/042 424/401 |
| 2010/0295287 A1* | 11/2010 | Reichert | C09B 67/009 283/70 |
| 2010/0295291 A1* | 11/2010 | Rancien | D21H 21/40 283/113 |
| 2011/0018252 A1* | 1/2011 | Petry | C09C 1/0015 283/72 |
| 2011/0174884 A1* | 7/2011 | Endres | B32B 37/1207 235/488 |
| 2011/0239885 A1* | 10/2011 | Marchant | B41M 3/148 101/483 |
| 2012/0170124 A1* | 7/2012 | Fuhse | G02B 5/285 359/585 |
| 2012/0228860 A1* | 9/2012 | Rauch | B42D 25/29 283/85 |
| 2012/0229368 A1* | 9/2012 | Watanabe | G07D 7/12 345/32 |
| 2013/0087622 A1* | 4/2013 | Collins | G06K 19/02 235/488 |
| 2014/0103632 A1* | 4/2014 | Camus | D21H 21/42 283/67 |
| 2015/0224809 A1* | 8/2015 | Tompkin | B42D 25/328 283/73 |
| 2015/0314629 A1* | 11/2015 | Ritter | D21H 21/42 283/85 |
| 2016/0059611 A1* | 3/2016 | Machizaud | D21H 17/67 283/91 |
| 2016/0325578 A1* | 11/2016 | Ritter | B42D 25/369 |

FOREIGN PATENT DOCUMENTS

| | | | | |
|---|---|---|---|---|
| CN | 1628039 A | 6/2005 | | |
| EP | 0498186 A1 | 8/1992 | | |
| EP | 0500726 B1 | 9/1992 | | |
| EP | 756945 A1 * | 2/1997 | | |
| EP | 0803550 A2 * | 10/1997 | | C09D 11/037 |
| EP | 1609619 A2 | 12/2005 | | |
| EP | 2075767 A1 * | 7/2009 | | G07D 7/12 |
| EP | 2219168 A2 * | 8/2010 | | B42D 15/00 |
| FR | 2764314 A1 * | 12/1998 | | D21H 21/42 |
| FR | 2803939 A1 * | 7/2001 | | B42D 25/41 |
| FR | 2871174 A1 | 12/2005 | | |
| JP | 07056377 A * | 3/1995 | | |
| JP | 09169161 A * | 6/1997 | | |
| JP | 10100573 A * | 4/1998 | | |
| JP | 11323785 A * | 11/1999 | | |
| JP | 2002088689 A | 3/2002 | | |
| JP | 2002266288 A * | 9/2002 | | |
| JP | 2002285061 A * | 10/2002 | | |
| JP | 2005015963 A * | 1/2005 | | |
| JP | 2006161224 A * | 6/2006 | | |
| JP | 2007216602 A * | 8/2007 | | |
| WO | WO-9516224 A1 * | 6/1995 | | B41M 3/14 |
| WO | 9723357 A1 | 7/1997 | | |
| WO | 03044276 A1 | 5/2003 | | |
| WO | 03054259 A1 | 7/2003 | | |
| WO | 2004040062 A1 | 5/2004 | | |
| WO | 2005124022 A2 | 12/2005 | | |
| WO | WO-2010040444 A1 * | 4/2010 | | B05D 5/066 |
| WO | 2012003947 A1 | 1/2012 | | |
| WO | 2012054053 A1 | 4/2012 | | |
| WO | 2012164054 A1 | 12/2012 | | |
| WO | WO-2013093848 A1 * | 6/2013 | | B32B 33/00 |
| WO | 2014167512 A1 | 10/2014 | | |
| WO | 2014167527 A1 | 10/2014 | | |

OTHER PUBLICATIONS

PCT/IB2014/060625 PCT International Search Report dated Oct. 16, 2014.

PCT/IB2014/060625 PCT Written Opinion of the ISA dated Oct. 11, 2015.

PCT/IB2014/060625 PCT International Preliminary Report on Patentability Chapter I dated Oct. 13, 2015.

PCT/IB2014/060560 PCT International Search Report dated Oct. 16, 2014.

PCT/IB2014/060560 PCT Written Opinion of the ISA dated Oct. 11, 2015.

PCT/IB2014/060560 PCT International Preliminary Report on Patentability Chapter I dated Oct. 13, 2015.

Non-Final Office Action in co-pending U.S. Appl. No. 14/783,868, dated Oct. 17, 2017.

Office Action in CN Appln. No. 201480033261.1, dated Dec. 15, 2017.

Office Action in CN Application No. 201480033256.0, dated Aug. 30, 2016.

Final Office Action in U.S. Appl. No. 14/783,868 dated Apr. 30, 2018.

Hacker Silicones (Perfect Toners Hide a Secret: HDK®—Pyrogenic Silica), Office Action dated Apr. 30, 2018, in U.S. Appl. No. 14/783,868.

Falbe and Regitz, Römpp Lexikon der Chemie, Edition 10, pp. 2150-2153 and 3019-3020, Georg Thieme Verlag, 1997.

Non-Final Office Action in U.S. Appl. No. 14/783,868, dated Oct. 2, 2018.

* cited by examiner

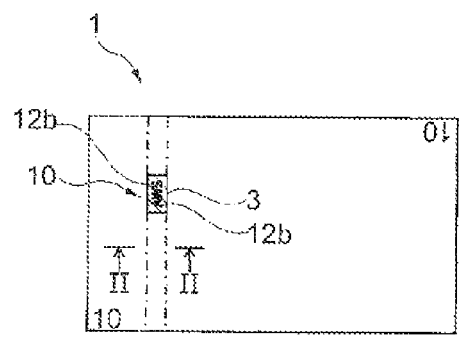
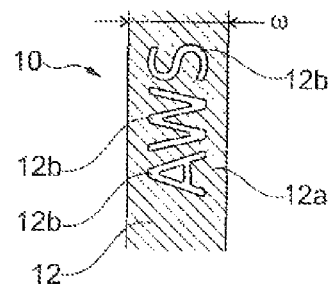
Fig. 1       Fig. 7
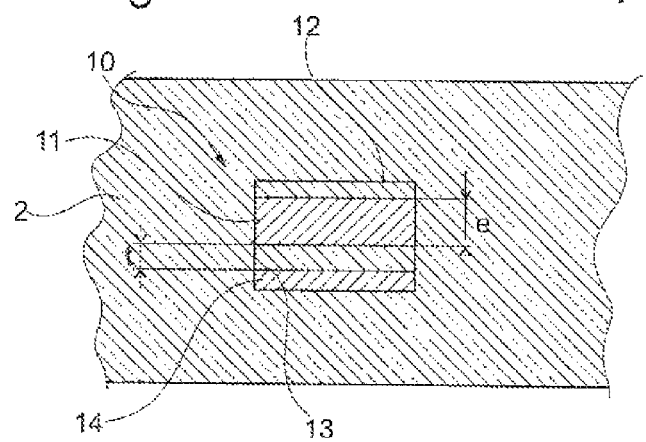
Fig. 2
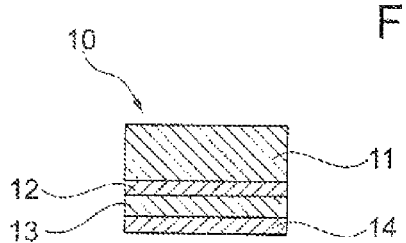    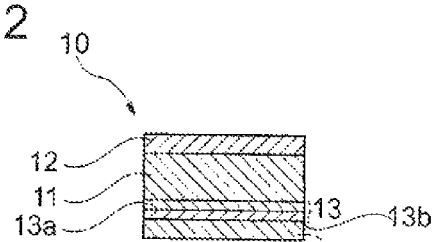
Fig. 3       Fig. 4
    
Fig. 5       Fig. 6

SECURITY ELEMENT COMPRISING AN INTERFERENCE PIGMENT AND A NANOMETRIC FILLER

This application is a national stage application of International PCT Application No. PCT/IB2014/060560, filed internationally on Apr. 9, 2014, which claims priority to French Application No. FR 13 53251, filed Apr. 11, 2013, the entire contents of each of which is incorporated by reference herein in its entirety.

The present invention relates to security elements and especially those intended for secured documents.

The expression "secured document" is understood to mean a means of payment, such as a banknote, a check or a meal ticket, an identity document, such as an identity card, a visa, a passport or a driving license, a lottery ticket, a travel ticket or pass, a revenue stamp, or even a ticket for entrance to a cultural or sporting event.

It is known to integrate a security thread into a paper substrate. This thread is either inserted entirely into the bulk of the paper or as a variant at least partially on the surface thereof, especially in a window. This thread generally comprises a text that appears under transmitted light, sometimes also referred to as CLEARTEXT®. Outside any window(s), it is preferable for the thread not to be visible in reflection, in order not to adversely affect the appearance of the document and not to hinder the visibility of the printings borne by the substrate. In addition, this provides an additional security measure, the thread and its text being hard or impossible to see under reflected light and visible under transmitted light.

To decrease the visibility of the thread, a plurality of solutions already exist.

A first solution consists in using a very reflective thread, obtained by depositing a relatively large thickness of metal, allowing a high optical density to be obtained. However, to obtain particular optical effects, especially based on the semi-transparency of the metal layer, certain security elements require metal layers, for example of aluminum, of low optical density.

A second solution consists in applying a masking layer to the thread. The use of a masking layer made of titanium dioxide, zinc oxide or other particles makes it possible to make the verso of the thread a matte white color, decreasing the metallic aspect of the thread. These layers are in general of small thickness and do not allow a security thread to be optimally masked. In addition, the increase in the thickness of such layers affects the visibility of the CLEARTEXT® under transmitted light.

US 2010/0213698 A1 discloses a solution of this type. The masking layer has light scattering properties similar to those of paper.

If the masking layer uniformly covers one face of the thread, its opacity decreases the visibility of the text under transmitted light. It is possible to deposit the masking layer only on the metal, but this complicates the manufacturing process. In addition, the masking layer may form a screen to UV and thus hamper the use of luminescent layers within the thread.

A third solution for decreasing the visibility of the thread consists in producing a masking layer taking the form of a continuous or half-tone semi-reflective metal layer. The drawback of this solution is that it decreases the visibility of the text.

FR 2 871 174 discloses a document comprising an information vector and a strip-shaped masking element.

US 2002/0056758 discloses an opaque protective layer applied to both faces of a magnetic layer. This opaque layer may contain iridescent pigments. One variant consists in printing the thread with an opaque ink, for example containing titanium dioxide, which does not let UV radiation pass, or optically variable pigments.

U.S. Pat. No. 5,876,068 describes a reflective metal layer applied to the entire surface of the thread.

Moreover, it is also known to apply, to security threads, a metal layer covered with a thin masking layer that is white or comprises a mattifying agent. Such a layer enables the operation of certain papermaking machine detectors, especially detectors of twisting of the security threads. However, by decreasing the reflection of the metal layer the thin masking layer makes the thread more visible in reflection. In addition, increasing the thickness of the masking layer decreases the visibility of the CLEARTEXT® under transmitted light.

There is a need for a security element that while being less visible under reflected light does not unduly degrade the legibility of information associated with the security element under transmitted light.

The invention achieves this aim by virtue of a security element, preferably taking the form of a security thread, for a secured document, comprising:
  a masking structure intended to decrease the visibility of a surface of the element when the latter is present within the document or on its surface, the masking structure comprising a nanoscale filler and a multilayer interferential pigment.

The filler and the pigment receive incident light and their optical effects may be added to decrease the visibility of the security element.

The masking structure preferably takes the form of a single masking layer, comprising the mixture of the pigment and filler, or according to one variant takes the form of two superposed layers containing the filler and the pigment, respectively. These two layers may be contiguous and superposed.

By virtue of the invention, the security element may be made less visible in the one or more zones in which its visibility would adversely affect the appearance of the document, because of the presence of the masking structure, which for example extends over at least the entirety of one face of the element.

The size of the nanoparticles of the filler induces scattering of the light dependent on the incident wavelength. Thus short (blue), medium (green) and long (red) wavelengths are not scattered with the same intensity. The blue is scattered more by particles of small size, the D50 of which is especially between 150 and 250 nm, and therefore a dominant red/orangey color is obtained in transmission (and therefore in specular reflection if the particles are placed on a layer that is at least partially reflecting) and a dominant bluish color in diffuse reflection.

The multilayer interferential pigment has the particularity of preferably selecting certain wavelengths in reflection and in transmission. For example, a blue iridescent pigment reflects in the specular direction (angle of reflection equal to the angle of incidence) more at blue wavelengths than at others. In transmission, the color obtained is then complementary to the color in reflection, i.e. red/orangey. The multilayer interferential pigments may be relatively transparent, because they are weakly absorbent, and therefore a layer of multilayer interferential pigments will have, in diffuse reflection (in all the other directions other than the specular direction) the same color as in transmission (complementary to the specular color in reflection). Taking again the above example, a layer of blue iridescent pigments spread over a piece of white paper will yield a red/orangey color.

By combining the color associated with the scattering of light by the nanoscale filler and the color associated with diffuse reflection by the multilayer interferential pigment, it is possible to obtain, by additive color mixing, a color, for example white, substantially similar to that of the substrate, by suitably choosing the color of the pigment and that of the filler; preferably, a multilayer interferential pigment that is blue, green or blue-green, or even a mixture of green and blue pigments, is combined with the nanoscale filler.

The combination of the pigment and the filler reinforces the scattering of incident light within the masking structure, and decreases the visibility in reflection of the security element.

Although the security element is preferably a security thread, the invention is still advantageous when the security element is a foil, a flake or another security element.

The expression "nanoscale filler" is understood to mean a filler of one or more pulverulent compounds, the D50 average size of which is comprised between 1 nm and 1000 nm. The filler may consist of a single particular material, which is preferably transparent to UV radiation.

In particular, the security element may comprise at least one luminescent agent and the nanoscale filler is at least partially, and preferably completely, transparent to UV radiation, especially UV radiation useful for luminescence. In this case, the nanoscale filler that is at least partially transparent to UV is present in an amount by weight comprised between 20 and 80%, better still between 30 and 70% and even better still between 40 and 60%, relative to the weight of the masking structure. All the weights are dry weights, unless otherwise indicated.

Nanoscale fillers such as silica, titanium dioxide, calcium carbonate, barium sulfate and zinc oxide may be used.

The nanoscale size of said filler makes it possible to increase the scattering of light within the masking structure. Such a filler scatters wavelengths corresponding to visible light, thereby making it possible to obtain an effect of masking of the security element located under the masking structure.

Preferably said nanoscale filler has a D50 size comprised between 30 and 1000 nm, better still between 30 and 500 nm and even better still between 50 and 300 nm.

The expression "multilayer interferential pigment" is understood to mean a pigment that produces a color via an interference effect by virtue of a succession, on the path followed by the light, of at least two materials of different refractive indices. A multilayer interferential pigment is even sometimes qualified as a "nacre" in the case of layers deposited on a platelet base. A multilayer interferential pigment is different from a liquid crystal, which may also generate a color via an interference effect because of its intrinsic structure.

Preferably, the multilayer interferential pigment according to the invention comprises a transparent and preferably mineral base coated with at least one layer of a material of different refractive index to that of the base. The pigment may comprise a platelet base that is preferably made of mica or glass. For example, the pigment comprises mica or silica (silicon dioxide) coated with titanium dioxide.

Preferably, as explained above, the interferential pigment has a blue, green or blue-green color.

The D50 average size of the pigment is preferably comprised between 2 and 150 microns, better still between 5 and 40 microns and even better still between 5 and 25 microns.

The multilayer interferential pigment may be non-goniochromic, and comprise for example only a single layer coating a base.

The security element may have two opposite major faces and the masking structure may be placed so as to decrease the visibility of at least one of said faces. For example, the masking structure covers a carrier of the security element on one of its sides. The masking structure may take the form of a continuous coating without openings, by virtue of the low opacity of the filler and of the pigment. Thus, manufacturing of the security element is facilitated. The masking structure may cover transparent or translucent zones of a security structure borne by the security element, and opaque zones of the security structure.

Again preferably, the nanoscale filler comprises colloidal and especially pyrogenated silica and better still consists of pyrogenated colloidal silica. A nanoscale filler comprising silica (silicon dioxide) is advantageous because it has the advantage of not absorbing UV radiation useful to luminescence, thereby making it possible to produce the security element with one or more layers that luminesce, and especially fluoresce, under UV.

The colloidal silica may be present in an amount by weight comprised between 20 and 80%, better still between 30 and 70% and even better still between 40 and 60% relative to the weight of the masking structure.

The colloidal silica preferably has a D50 size comprised between 30 and 1000 nm, better still between 30 and 500 nm and even better still between 50 and 300 nm.

The amount by weight of multilayer interferential pigment relative to the weight of the masking structure is comprised between 1 and 40%, better still between 2 and 30% and even better still between 5 and 15%. All the weights are dry weights, unless otherwise indicated.

The thickness of the masking structure, especially when the latter takes the form of a single layer, may be comprised between 2 and 30 microns, better still between 5 and 20 microns and even better still between 8 and 13 microns.

The pigment and the filler (or fillers) may be dispersed in a binder, which may be of any type, and especially be applied in the fluid state to the element during its manufacture. This binder may be cross-linked on drying or under UV radiation.

The security element may comprise a security structure which may be produced in various ways. Preferably the security structure comprises an opaque layer, especially printed or deposited by a vacuum deposition process, and at least one opening in this opaque layer. Particularly advantageously, the security structure is reflective and especially comprises a metallization/demetallization. It is preferably a question of a reflective security structure of low optical density, especially associated with subjacent opaque layers. The metal is for example aluminum, gold, copper, iron, silver, chromium, nickel, zinc, cadmium, bismuth and alloys and oxides thereof. Openings taking the form of text, for example of a negative script, are formed conventionally in the metal by demetallization.

The security element may comprise an additional nanoscale filler, within the masking structure. In this case, the two nanoscale fillers are preferably different, at least their refractive indices being different and especially differing by at least 0.5 and more preferably by at least 0.8.

Preferably, said additional nanoscale filler has a D50 size comprised between 30 and 1000 nm, better still between 30 and 500 nm and even better still between 50 and 300 nm.

Thus, adding an additional nanoscale filler amplifies the light scattering effect and allows optimal masking to be obtained, especially for a given thickness of the masking structure.

Without wanting to be tied to one theory, the Applicant believes that mixing said at least two nanoscale fillers of different refractive indices allows the scattering effect to be amplified because the nanoscale filler of lower refractive index poorly refracts incident light that then follows a longer optical path and penetrates further into the masking structure, whereas the nanoscale filler of higher refractive index increases the number of times light is scattered within the masking structure. Thus both high penetration and substantial scattering of light within the masking structure is obtained, thus allowing said security element to be masked in reflection without the masking structure being opaque, which would adversely affect the visibility of the security element under transmitted light.

The additional nanoscale filler is preferably incorporated into a masking structure taking the form of a single masking layer, comprising a mixture containing the nanoscale fillers and a multilayer interferential pigment.

The amount by weight of additional nanoscale filler relative to the weight of the masking structure is preferably comprised between 1 and 40%, better still between 2 and 30% and even better still between 3 and 15%.

The security element may comprise, by way of additional nanoscale filler, titanium dioxide in the masking structure. Preferably, the amount of titanium dioxide is small enough not to unduly absorb UV radiation and to make it possible to use within the security element at least one luminescent compound, which is especially fluorescent under UV (365 nm), for example applied by printing or mixed into the masking layer or into a lacquer or into an adhesive of the security element.

Depending on this combination, care will be taken to limit the proportion of the nanoscale filler having the highest refractive index, for example titanium dioxide, in order to limit opacification in transmitted light and if needs be absorption of UV.

The titanium dioxide is preferably of anatase nature, because it then has the advantage of absorbing UV more weakly relative to titanium dioxide of rutile nature. The anatase titanium dioxide is especially at least partially transparent to UV and, in particular transparent to at least one wavelength range in the UV domain.

The titanium dioxide may be present in an amount by weight comprised between 1 and 40%, better still between 2 and 30% and even better still between 3 and 15% relative to the weight of the masking structure.

The titanium dioxide preferably has a D50 size comprised between 30 and 1000 nm, better still between 30 and 500 nm and even better still between 50 and 300 nm.

According to a preferred variant, said masking structure takes the form of a single masking layer, containing a mixture of the especially pyrogenated colloidal silica, the especially anatase titanium dioxide and a multilayer interferential pigment.

According to this variant, the colloidal silica induces more substantial scattering of the light at short (blue) wavelengths and therefore a dominant red/orangey color is obtained in transmission (and therefore in specular reflection if the particles are placed on a layer that is at least partially reflecting). The titanium dioxide makes it possible to modify the path followed by the light by increasing scattering within the masking structure, thereby increasing opacity and thus decreasing the red/orangey reflective aspect produced by the colloidal silica.

Preferably, the security element according to the invention comprises a carrier, especially made of a thermoplastic material and preferably of PET or polyester. This carrier is preferably entirely transparent.

The security structure may be located on one side of the carrier and the masking structure on the other side. The security structure and the masking structure may also both be located on the same side of the carrier. The masking structure may even be present twice on the security element, on each side of the carrier, which may be desirable in order to mask a magnetic thread for example.

The security element may comprise a luminescent and especially fluorescent agent, for example applied by printing, mixed into a lacquer or into an adhesive of the security element or preferably incorporated into the masking structure and more preferably mixed into a masking layer comprising the multilayer interferential pigment and the nanoscale filler.

The security element may comprise a heat-sealing adhesive especially making contact with the masking structure. The adhesive may comprise a luminescent agent and especially one that is fluorescent under UV.

It is advantageous for the security element to comprise a luminescent agent, preferably one that is fluorescent under UV, especially within a layer distinct from the masking structure, preferably within a layer located opposite the security structure relative to the carrier, when the latter exists.

Another subject of the invention, according to another of its aspects, is a secured document incorporating a security element according to the invention. The security element is for example incorporated into the bulk, into a window or on the surface of the substrate of the document. The masking structure may be present on the verso of the security element, when the window is located on the recto thereof.

The security element may or not extend from one edge to the other of the document.

The document may comprise one or more additional security elements such as defined below.

Among the additional security elements, certain ones are detectable by eye, under daylight or under artificial light, without use of a particular apparatus. These additional security elements for example comprise colored flakes or fibers and/or partially or completely metallized or printed threads. These additional security elements are what are called level one security elements.

Other types of additional security elements are detectable only using a relatively simple apparatus, such as a lamp emitting in the ultraviolet (UV) or infrared (IR). These additional security elements for example comprise fibers, flakes, strips, threads or particles. These security elements may or may not be visible to the naked eye, for example being luminescent under the illumination of a Wood's lamp emitting at a wavelength of 365 nm. These security elements are what are called level two security elements.

To be detected, other types of additional security elements require a more sophisticated apparatus. These security elements are for example capable of generating a specific signal when they are subjected, whether simultaneously or not, to one or more sources of external excitation. Automatic detection of the signal makes it possible to authenticate, if needs be, the document. These additional security elements for example comprise tracers taking the form of active materials, particles or fibers, that are capable of generating a specific signal when these tracers are subjected to an optronic, electrical, magnetic or electromagnetic excitation. These additional security elements are what are called level three security elements.

The one or more additional security elements present within the document may have level one, two or three security properties.

Yet another subject of the invention, according to another of its aspects, is a method for authenticating a document such as defined above, in which the security element is observed under transmitted light. The observation may be carried out through a window in the document.

Yet another subject of the invention, according to another of its aspects, is a process for manufacturing a document such as defined above, in which the security element is incorporated into a window or the surface of the document.

The invention will be better understood on reading the following detailed description of nonlimiting exemplary embodiments thereof, and on examining the appended drawings, in which:

FIG. 1 schematically shows an exemplary secured document according to the invention;

FIG. 2 shows in transverse cross section along II-II the secured document and the security element;

FIGS. 3 and 4 show in transverse cross section along II-II variants of the security element;

FIG. 5 shows in cross section a variant secured document according to the invention;

FIG. 6 shows in isolation a variant security element; and

FIG. 7 shows in isolation and from above the security element in FIG. 2.

In the figures, the actual respective proportions of the various constituent elements have not always been respected, for the sake of the clarity of the drawings. In addition, certain layers may have been shown as monolayers in the figures whereas in fact they are made up of a plurality of sublayers. Adhesive layers may not have been shown between various constituent layers.

FIG. 1 shows an exemplary secured document 1 according to an exemplary implementation of the invention.

The document 1 comprises a substrate 2, preferably made of paper, formed from one or more plies.

The document 1 integrates a security element 10 according to the invention, taking the form of a thread in the example in question.

The security element 10 comprises a carrier 11 made of a thermoplastic material, which ensures the mechanical strength of the thread. This carrier 11 is for example made of a transparent thermoplastic material such as PET or polyester. The thickness e of the carrier 11 for example ranges from 6 to 30 μm and the width w of the element 10 from 1 to 10 mm.

The security element 10 comprises a security structure 12, for example formed by metallization/demetallization. The security structure 12 thus comprises, for example, an opaque metal layer 12a and openings 12b taking the form of letters or other recognizable patterns. These openings 12b are visible under light transmitted through a window 3 in the document 1. The security structure 12 may also form a recognizable half-tone image, the subject of which is for example moreover present on the document. Although the security structure preferably comprises a metallization/demetallization, it may also comprise printed patterns, for example printed with a metallic, magnetic or electrically conductive ink.

The security element 10 comprises a masking structure 13, for example, as illustrated in FIG. 2, taking the form of a single layer located opposite the security structure 12 relative to the carrier 11.

The security element 10 may also comprise a layer of a heat-sealing adhesive 14, preferably located, as illustrated, on an external face of the element 10, for example on the side opposite the security structure 12 relative to the carrier 11. The element 10 may comprise a heat-sealing adhesive layer on each of its external faces.

The layer 14 may comprise a luminescent and especially fluorescent agent. The masking structure 13 makes it possible to decrease the visibility of the element in the substrate 2 while preserving the transparency of the patterns 12b in transmission, and the transparency to UV if required.

The invention makes it possible to avoid a problem with excessive thickness within the substrate, because the masking structure 13 may be of relatively small thickness t.

The invention, by virtue of the presence of the masking layer 13, allows a metal layer of relatively low optical density to be used to produce the security structure 12, without this in any way making the thread too visible in reflection.

Preferably, the masking structure 13 comprises colloidal pyrogenated silica, the particle size of which is nanoscale, combined with an iridescent pigment, for example Iriodin® from Merck.

The pigment preferably has a transparent base that is for example made of mica, and optical properties that are complementary to those of the colloidal pyrogenated silica. When the substrate is white, the pigment is preferably blue or green or blue-green. The color of the pigment is that obtained in specular reflection at non-normal incidence.

The colloidal pyrogenated silica consists of silica nanoparticles, the size of which is smaller than 120 nm for half of the particles.

The size of the silica particles is preferably comprised between 30 nm and 1000 nm, again preferably between 30 and 500 nm and more preferably between 50 and 300 nm.

The thickness t of the masking layer is preferably comprised between 2 and 30 μm, again preferably between 5 and 20 μm and better still between 8 and 13 μm.

The amount of multilayer interferential pigment relative to the weight of the masking structure is preferably comprised between 1 and 40%, better still between 2 and 30% and preferably between 3 and 15%.

The size of the pigment is preferably comprised between 2 and 150 μm, again preferably between 5 and 40 μm and more preferably between 5 and 25 μm.

EXAMPLE

A masking layer 13 having the following composition is used:
- nanoscale filler Aerodisp W7330N from Evonik: 50% by dry weight;
- iridescent pigment of reference 221 from Merck: 10% by dry weight; and
- binder Cromelastic SE871 from Cromogenia-Units: 40% by dry weight.

This layer may be applied by rotogravure (or roto-coating) in the form of a coating of uniform thickness of 10 microns.

In this example, the security structure 12 is a layer of aluminum of 300 nm thickness, with a text in negative script, as illustrated in FIG. 4. The carrier 11 is made of PET.

In one variant, above the metal layer of the security structure 12, at least one optically variable layer (called an OVI) may also be deposited. This additional layer (not shown) for example comprises liquid crystals, iridescent pigments and/or interferential layers or structures such as a hologram.

The security element may also comprise a magnetic coating, for example in the form of a code.

Generally, titanium dioxide may be added to the masking layer 13, in small amounts, in order to increase the scattering of light. It is preferably a question of Rutile PGG 121 titanium dioxide from Cristal the D50 particle size of which is smaller than 220 nm.

In this case, the following composition may be substituted for the preceding one:

nanoscale filler Aerodisp W7330N from Evonik: 50% by dry weight;
iridescent pigment of reference 221 from Merck: 6% by dry weight;
nanoscale filler Rutile PGG 121 from Cristal: 6% by dry weight; and
binder Cromelastic SE871 from Cromogenia-Units: 38% by dry weight.

Another variant consists in depositing the titanium dioxide in a separate layer between the carrier 11 and the masking layer 13.

FIG. 3 illustrates the possibility for the security structure 12 and the masking structure 13 to be located on the same side of the carrier 11. The other face of the carrier may receive any additional security measure, for example a luminescent compound, an optically variable structure, a holographic structure or a structure based on a lenticular array.

FIG. 4 shows a security element 10 in which the masking structure 13 is composed of two superposed layers 13a and 13b containing the nanoscale filler and the multilayer interferential pigment, respectively. These two layers may be applied one on the other.

The security element may take the form of a security thread integrated entirely into the bulk of the substrate of the security document. In this case, the masking layer is advantageously applied to both faces of the thread in order to mask the latter in reflection and allow it to be observed under transmitted light.

Although the invention is particularly advantageously applicable to a security thread, the security element 10 may also take the form of a foil or a patch applied to the surface of the substrate 2 of the document 1, as illustrated in FIG. 5.

The masking structure according to the invention then makes it possible to make the interior face 19 of the element 10, i.e. that face which is turned toward the substrate 2, less visible when the masking structure is interposed between the substrate 2 and the one or more layers of the security element to be hidden.

In the example in FIG. 6, the security element 10 takes the form of a flake. The masking structure may extend over both the major faces of the flake. The latter may comprise a luminescent and especially fluorescent compound.

In another variant, the security element takes the form of an especially colored magnetic and/or metal fiber.

Although the invention is preferably applied to a paper substrate that is white in color, the substrate may be slightly colored.

In this case, the masking layer may be substantially white or have the same slight coloring. The color of the masking layer may be adjusted by adjusting the color of iridescence of the multilayer interferential pigment and, if need be, the color of the nanoscale filler.

Nanoscale filler other than pyrogenated colloidal silica may be used, this filler preferably being a material that is transparent to UV and preferably also not opaque. Other nanoscale fillers such as calcium carbonate and barium sulfate may be used with and/or to replace silica.

The expression "comprising a" must be understood as being synonymous with "comprising at least one", unless otherwise specified.

The invention claimed is:

1. A security element for a secured document, comprising:
a security structure comprising an opaque layer and at least one opening in this opaque layer; and
a masking structure superposed at least partially on the security structure, for decreasing visibility of the security element in reflected light, the security element being present within the secured document or on a surface of the secured document, the masking structure comprising a nanoscale filler and a multilayer interferential pigment, the security element being visible under transmitted light through the masking structure.

2. The security element as claimed in claim 1, the security element forming a security thread, a foil, a patch, a flake or a fiber.

3. The security element as claimed in claim 1, the security element having two opposite major faces and the masking structure decreasing visibility of at least one of said faces.

4. The security element as claimed in claim 1, the multilayer interferential pigment comprising a mineral base coated with at least one layer of a refractive index different from that of the base.

5. The security element as claimed in claim 4, the base being a platelet base.

6. The security element as claimed in claim 1, an amount by weight of multilayer interferential pigment relative to a weight of the masking structure being comprised between 1 and 40%.

7. The security element as claimed in claim 1, a size of the multilayer interferential pigment being comprised between 2 and 150 microns.

8. The security element as claimed in claim 1, the nanoscale filler having a D50 size comprised between 30 and 1000 nm.

9. The security element as claimed in claim 1, the nanoscale filler comprising colloidal silica.

10. The security element as claimed in claim 9, said colloidal silica being present in an amount by weight comprised between 20 and 80%, relative to the weight of the masking structure.

11. The security element as claimed in claim 1, a thickness (t) of the masking structure being comprised between 2 and 30 microns.

12. The security element as claimed in claim 1, the pigment and the nanoscale filler being dispersed in a binder within a layer of the masking structure.

13. The security element as claimed in claim 1, the at least one opening taking a form of a negative script.

14. The security element as claimed in claim 1, comprising a carrier, made of a thermoplastic material.

15. The security element as claimed in claim 14, the security structure being located on one side of the carrier and the masking structure on the other side.

16. The security element as claimed in claim 14, the security structure and the masking structure being located on the same side of the carrier.

17. The security element as claimed in claim 1, comprising an additional nanoscale filler.

18. The security element as claimed in claim 17, said additional nanoscale filler being present in an amount by weight, relative to the weight of the masking structure, comprised between 1 and 40%.

19. The security element as claimed in claim 17 or 18, the nanoscale fillers having refractive indices that differ by at least 0.5.

20. The security element as claimed in claim 1 furthermore comprising a luminescent agent, mixed in a masking layer of the masking structure comprising the multilayer interferential pigment and the nanoscale filler.

21. The security element as claimed in claim 1, comprising a heat-sealing adhesive making contact with the masking structure.

22. The security element as claimed in claim 21, the adhesive comprising a luminescent agent.

23. The security element as claimed in claim 22, comprising a luminescent agent, within a layer distinct from the masking structure.

24. A document incorporating a security element as claimed in claim 1.

\* \* \* \* \*